(12) United States Patent
Mahncke

(10) Patent No.: US 6,382,654 B1
(45) Date of Patent: May 7, 2002

(54) TOWING DEVICE FOR VEHICLES

(75) Inventor: Jürgen Mahncke, Tiefenbronn (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/617,874

(22) Filed: Jul. 17, 2000

(30) Foreign Application Priority Data

Jul. 17, 1999 (DE) .......................................... 199 33 652

(51) Int. Cl.⁷ ................................................ B60D 1/54
(52) U.S. Cl. ................. 280/491.1; 280/495; 280/491.5; 403/12; 411/412
(58) Field of Search ................................ 280/515, 495, 280/491.1, 480.1, 491.5, 491.3, 500; D12/162; 403/11, 12, 326; 411/412, 400, 401, 517

(56) References Cited

U.S. PATENT DOCUMENTS

| | | | |
|---|---|---|---|
| 2,309,850 A | | 2/1943 | Klawitter ..................... 280/33 |
| 2,576,461 A | * | 11/1951 | Kammerer |
| 2,665,923 A | * | 1/1954 | Perry |
| 3,717,362 A | | 2/1973 | Johnson |
| 3,754,418 A | | 8/1973 | Miller ............................ 70/18 |
| 3,823,962 A | * | 7/1974 | Martin, Jr. .................. 280/514 |
| 4,182,579 A | * | 1/1980 | McCormick et al. ........ 403/326 |
| 4,464,090 A | * | 8/1984 | Duran .......................... 411/103 |
| 4,877,364 A | * | 10/1989 | Sorrentino ................... 411/337 |
| 5,433,547 A | | 7/1995 | Hart et al. ..................... 403/24 |
| 5,639,113 A | * | 6/1997 | Goss et al. ............... 280/728.2 |
| 6,149,181 A | * | 11/2000 | Biederman ............... 280/491.1 |
| 6,189,910 B1 | * | 2/2001 | Bartel ..................... 280/491.2 |

FOREIGN PATENT DOCUMENTS

| | | |
|---|---|---|
| DE | 1 865 806 | 9/1962 |
| DE | 6948391 | 12/1969 |
| DE | 2936789 | 4/1981 |
| DE | 3612206 | 10/1987 |
| DE | 8708219.5 | 10/1987 |
| DE | 4301370 | 8/1993 |
| DE | 195 17 461 | 10/1995 |
| DE | 4423633 | 1/1996 |
| DE | 298 23 354 | 5/1999 |
| FR | 2 730 672 | 8/1996 |

* cited by examiner

Primary Examiner—Avraham H. Lerner
(74) Attorney, Agent, or Firm—Crowell & Moring LLP

(57) ABSTRACT

A towing device for vehicles is connected with a connection pin for a holding on the vehicle body and a hook-in eye connected with the pin, the connection pin having a fastening section as well as a lug part forming the hook-in eye. In a towing position and in an inoperative position, the connection pin is held in a support part of the vehicle body so that it cannot be lost, and, in the towing position, the connection pin with the fastening section can be fixed in a tension-resistant and pressure-resistant manner in a holding element of the support part and, in the inoperative position, can be fixed in the holding element by way of a locking device arranged adjacent to the hook-in eye.

13 Claims, 3 Drawing Sheets

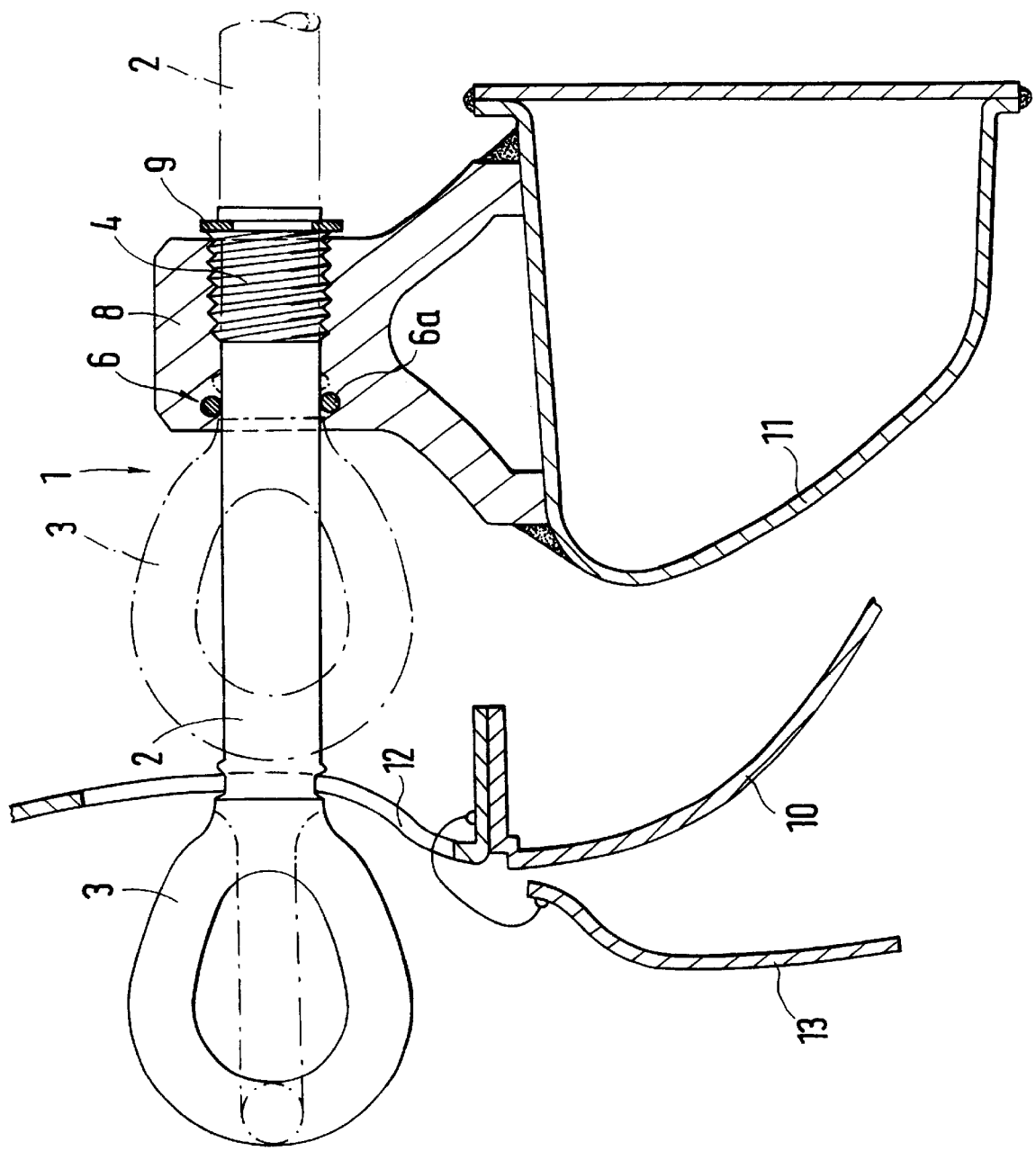

TOWING DEVICE FOR VEHICLES

BACKGROUND AND SUMMARY OF THE INVENTION

This application claims the priority of German patent document 199 33 652.0, filed Jul. 17, 1999, the disclosure of which is expressly incorporated by reference herein.

The invention relates to a towing device for vehicles having a connection pin for holding on the vehicle body and a hook-in eye connected with the pin, the connection pin having a fastening section as well as a lug part forming the hook-in eye.

From German Patent Document DE 44 23 633 C2, a towing lug is known which has a connection pin which can be connected with the vehicle for towing and, for this purpose, has a thread section at its free end facing away from the towing lug. After the conclusion of the towing operation, the connection pin is released, for example, from the vehicle carrier and is accommodated separately in the vehicle.

It is an object of the invention to provide a towing device for vehicles which is arranged in the vehicle so that it can be easily handled.

According to the invention, this object is achieved by providing an arrangement of the above noted type, wherein the connection pin is held so that it cannot be lost, the connection pin being held in a support part of the vehicle body in a towing position and in an inoperative position, and, in the towing position, can be fixed in a tension-resistant and pressure-resistant manner by a fastening section in a holding element of the support part and, in an inoperative position, can be fixed in the holding element by way of a locking device arranged adjacent to the hook-in eye.

Further advantageous features of preferred embodiments of the invention are described herein and in the claims. Principal advantages achieved by means of the invention are that the towing device cannot be lost; that is, it is constantly connected with the vehicle such that, as a result of a simple pulling-out and pushing-back-in, a towing position and an inoperative position can be achieved. This arrangement of the towing device facilitates the handling because the handling of a local towing device, for example, arranged in the tool set, requires high expenditures.

For this purpose, the connection pin is held in a support part of the vehicle body in a towing position and in an inoperative position in such a manner that it cannot be lost. In the towing position, the connection pin can be fixed while being resistant to tension and to pressure by means of its fastening section in a holding element of the support part. In the inoperative position, the connection pin is fastened in the holding element by way of a locking device arranged adjacent to a hook-in eye.

So that the connection pin cannot be completely unscrewed, an end stop is provided on its free end, which end stop rests on the holding element in the towing position, so that the pull-out length of the connection pin is limited.

So that the connection pin can take up a fixed position in the vehicle also in the inoperative position, the connection pin has locking devices which may consist of a threaded section or a holding ring on the connection pin or in the holding element. These locking devices have corresponding detents or threads.

According to another advantageous feature of preferred embodiments of the invention, the connection pin can be fixed in the holding element also by way of a type of bayonet catch.

In the pushed-in inoperative position, the connection pin can be firmly locked in the holding element, for the purpose of which the holding ring is provided in the holding element or on the pin. This holding ring engages in a corresponding ring groove or the like in the holding element or in the pin. The holding ring can consist of a snap ring or a spring-type ring or a retaining ring.

For the hidden arrangement of the towing device in the vehicle, the connection pin with the towing lug can be pushed so far into the vehicle that the lug is situated between a support of the vehicle and an exterior cover panel or a front-end apron or rear apron. The apron has an opening which can be closed by a hinged flap or a cover.

The connection pin can be arranged in the vehicle support or in a holding part arranged on the support or in a console. It is also possible to arrange the connection pin within an impact deflector between the bumper and the cross member or body structure.

Other objects, advantages and novel features of the present invention will become apparent from the following detailed description of the invention when considered in conjunction with the accompanying drawings.

BRIEF DESCRIPTION OF THE DRAWINGS

FIG. 3 is a view of a third embodiment of the towing device with an arrangement on a support of the vehicle body structure with a ring-type locking device shown as an example.

DETAILED DESCRIPTION OF THE DRAWINGS

Figure 1:
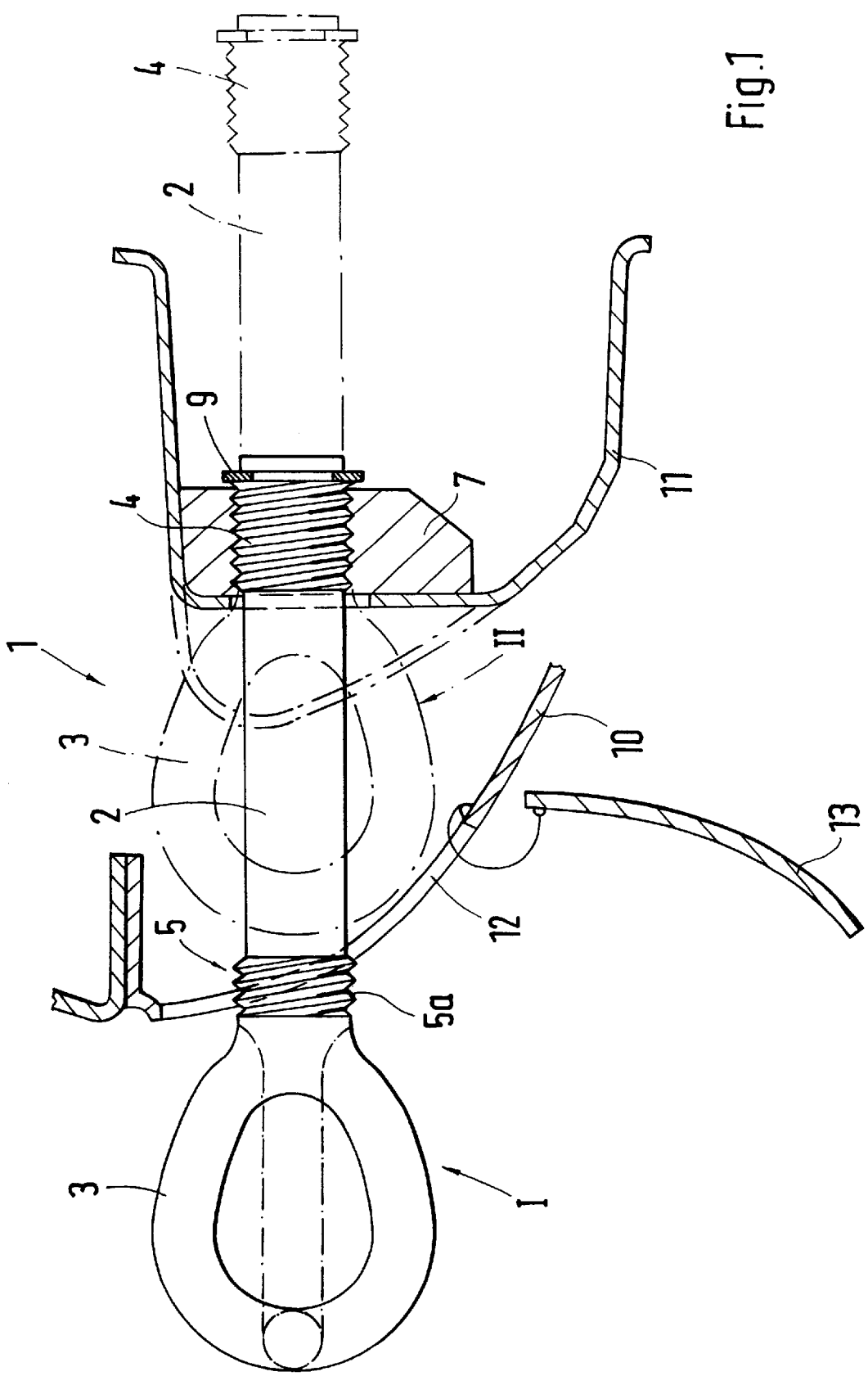
FIG. 1 is a partially sectional, lateral view of a first embodiment of a towing device in a support of a body structure with a thread-type locking device.

The towing device 1 comprises essentially a connection pin 2 with a hook-in eye 3, which connection pin 2 has a fastening section 4 on the end side and, adjacent to the hook-in eye 3, devices 5, 6 for a fixing in the vehicle body structure.

By means of a fastening section consisting of a thread 4, the connection pin 2 is fixed in a holding element 7 (FIGS. 1 and 2) or in a holding element 8 (FIG. 3) in a towing position. In an inoperative position II, the connection pin can be fixed in a pushed-in condition by means of the devices 5 (FIG. 1); 6 (FIGS. 2 and 3).

On the end side of the pin 2, the fastening section 4 is equipped with a disk 9 or the like for use as an end stop, so that, in the towing position I, the pin 2 cannot be unscrewed from the holding element 7.

Figure 2:
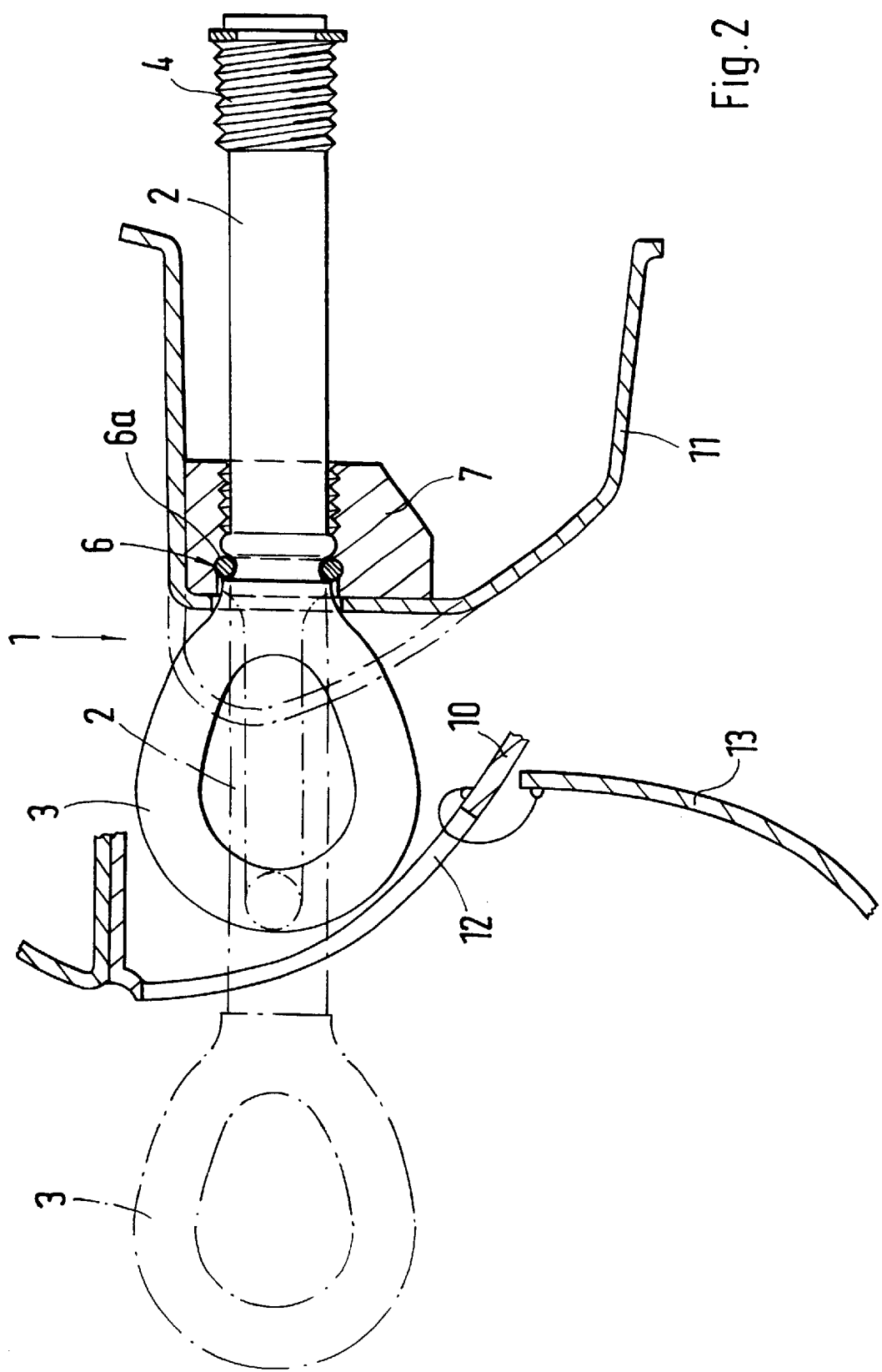
FIG. 2 is a view of a second embodiment of the towing device according to FIG. 1 with a ring-type locking device.

In FIG. 1, the towing position I is illustrated by drawn-out lines and the inoperative position II is illustrated by dash-dotted lines. The holding devices 5; 6 for fixing the connection pin 2 in the inoperative position II can consist of a thread section 5a or a holding ring 6a. The thread section 5a can be screwed into a threaded bore of the holding element 7; 8. The holding ring 6a can be fixed either in the holding element 7; 8 or on the connection pin 2; it engages in or snaps into a corresponding ring groove of the holding element 7; 8 or of the connection pin 2, whereby the connection pin 2 is firmly held in its position.

Instead of the end-side thread section 5a, for a fixing in the inoperative position II, the connection pin 2 can also consist of a bayonet catch or the like.

For a hidden arrangement of the towing device 1 in the vehicle, the connection pin 2 with its hook-in eye 3 is arranged behind a front-end and/or rear apron or a hood 10, the hook-in eye 3 being disposed between the apron 10 and the support 11 of the vehicle body. The apron 10 has an opening 12, through which the towing device 1 is to be pulled out. This opening 12 can be closed by way of a flap 13 or a hinged flap.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Towing device for vehicles, comprising a connection pin for holding on a vehicle body and a hook-in eye connected with the pin, the connection pin having a fastening section as well as a lug part forming the hook-in eye, wherein the connection pin is held so that it cannot be lost, the connection pin being held in a support part of the vehicle body in a towing position and in an inoperative position, and, in the towing position, the connection pin can be fixed in a tension-resistant and pressure-resistant manner by means of a fastening section in a holding element of the support part, wherein when in the towing position, a thread area of the fastening section at a remote end of the connection pin is threaded into the holding element to fix the fastening section in the holding element and, in an inoperative position, the connection pin can be fixed in the holding element by way of a locking device arranged adjacent to the hook-in eye.

2. Towing device according to claim 1,
   wherein the connection pin fastening section further includes an end stop at the remote end, wherein the end stop rests against the holding element in the towing position.

3. Towing device according to claim 1,
   wherein the locking device comprises a thread area which, in the inoperative position, can be fixed in a threaded bore of the holding element.

4. Towing device according to claim 2,
   wherein the locking device comprises a thread area which, in the inoperative position, can be fixed in a threaded bore of the holding element.

5. Towing device according to claim 1,
   wherein the locking device comprises a holding ring which is arranged on the connection pin or in the holding element.

6. Towing device according to claim 2,
   wherein the locking device comprises a holding ring which is arranged on the connection pin or in the holding element.

7. Towing device according to claim 1,
   wherein a holding ring of the locking device is arranged to be snapped into a ring groove of the holding element.

8. Towing device according to claim 5,
   wherein the holding ring of the locking device is arranged to be snapped into a ring groove of the holding element.

9. Towing device according to claim 1,
   wherein a holding ring of the locking device is arranged to be snapped into a ring groove of the connection pin.

10. Towing device according to claim 5,
    wherein the holding ring of the locking device is arranged to be snapped into a ring groove of the connection pin.

11. Towing device according to claim 1,
    wherein, in the inoperative position, the connection pin with the hook-in eye is arranged to be hidden by an apron part of the motor vehicle between the apron part and the support part.

12. Towing device according to claim 11,
    wherein the apron part has a passage opening for the connection pin or the lug part, and the opening can be closed by way of a flap.

13. A vehicle towing assembly comprising:
    a vehicle support part,
    a vehicle holding element spaced from the support part, and
    a connection pin with a hook eye adapted to be engaged by a device to be towed, the connection pin including a fastening section having a thread area at a remote end of the connection pin,
    wherein the connection pin is movable between an extended towing position fixed in a tension and pressure resistant manner to the vehicle holding element, wherein when in the towing position, the thread area of the fastening section is threaded into the holding element to fix the fastening section in the holding element, and a retracted storage position wherein the connection pin can be fixed in the holding element by way of a locking device.

\* \* \* \* \*